Figure 1:
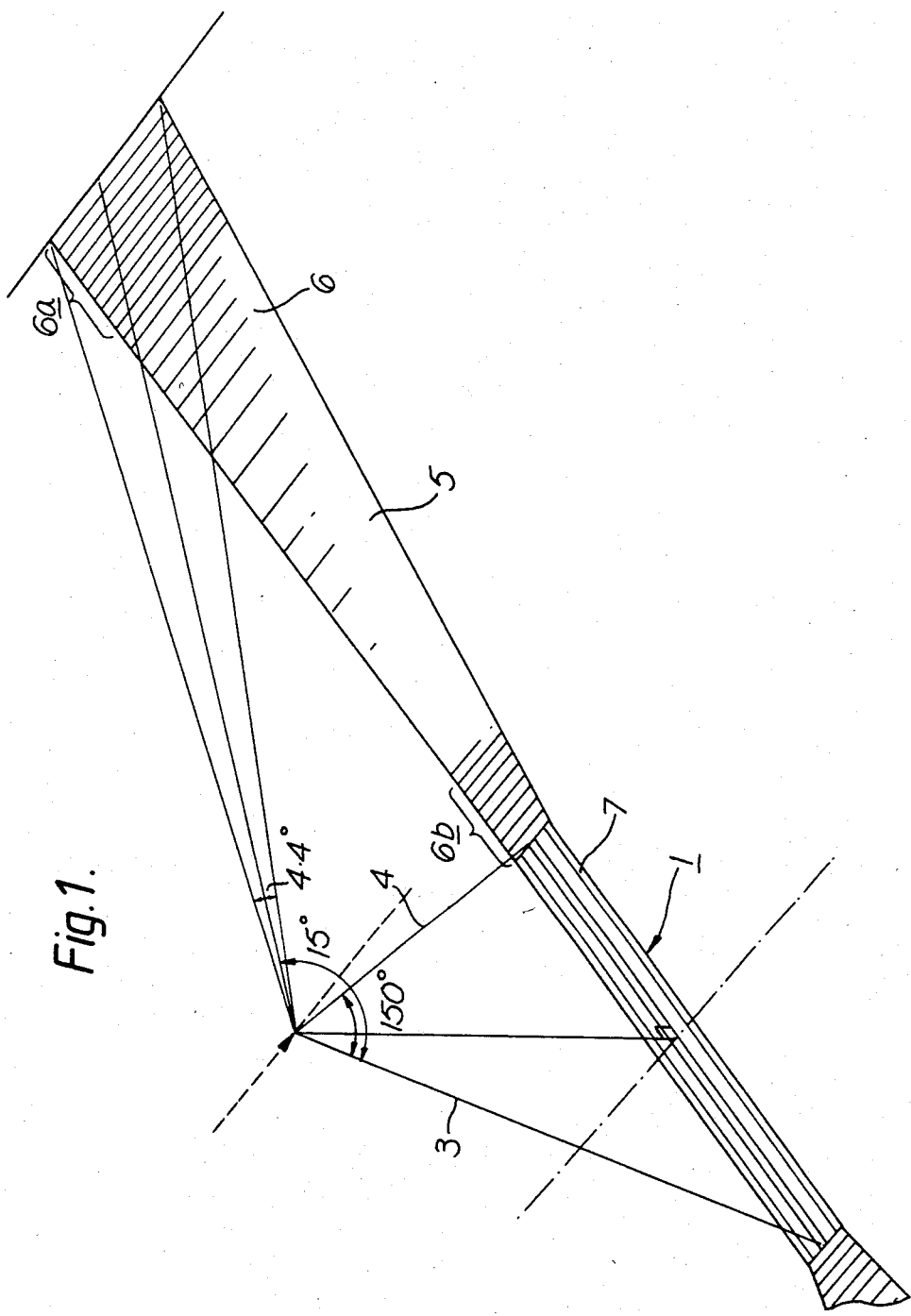

United States Patent [19]

Grainge et al.

[11] Patent Number: 4,516,158

[45] Date of Patent: May 7, 1985

[54] GROUND RECONNAISSANCE

[75] Inventors: Richard W. Grainge; Rowland F. Humphries, both of Hertfordshire, England

[73] Assignee: British Aerospace Public Limited Company, London, England

[21] Appl. No.: 403,815

[22] Filed: Jul. 30, 1982

[30] Foreign Application Priority Data

Jul. 31, 1981 [GB] United Kingdom ............... 8123582

[51] Int. Cl.³ .................... H04N 5/33; H04N 7/18
[52] U.S. Cl. ................................. 358/109; 358/113
[58] Field of Search ................. 358/109, 113; 250/334

[56] References Cited

U.S. PATENT DOCUMENTS 3,995,159 11/1976 Elliot ................................. 250/370
4,301,467 11/1981 Jaeger ............................... 358/41

FOREIGN PATENT DOCUMENTS 1270651 4/1972 United Kingdom .
1375158 11/1974 United Kingdom .
2007909 5/1979 United Kingdom .

Primary Examiner—John C. Martin
Assistant Examiner—Victor R. Kostak
Attorney, Agent, or Firm—Cushman, Darby & Cushman

[57] ABSTRACT

Ground reconnaissance equipment for an air or spacecraft comprising two line-scanners, for example infrared sensitive scanners, operable for scanning respective ground areas along lines extending in different directions and a control system for producing selected kinds of video display and/or electronic or photograph recording.

7 Claims, 5 Drawing Figures

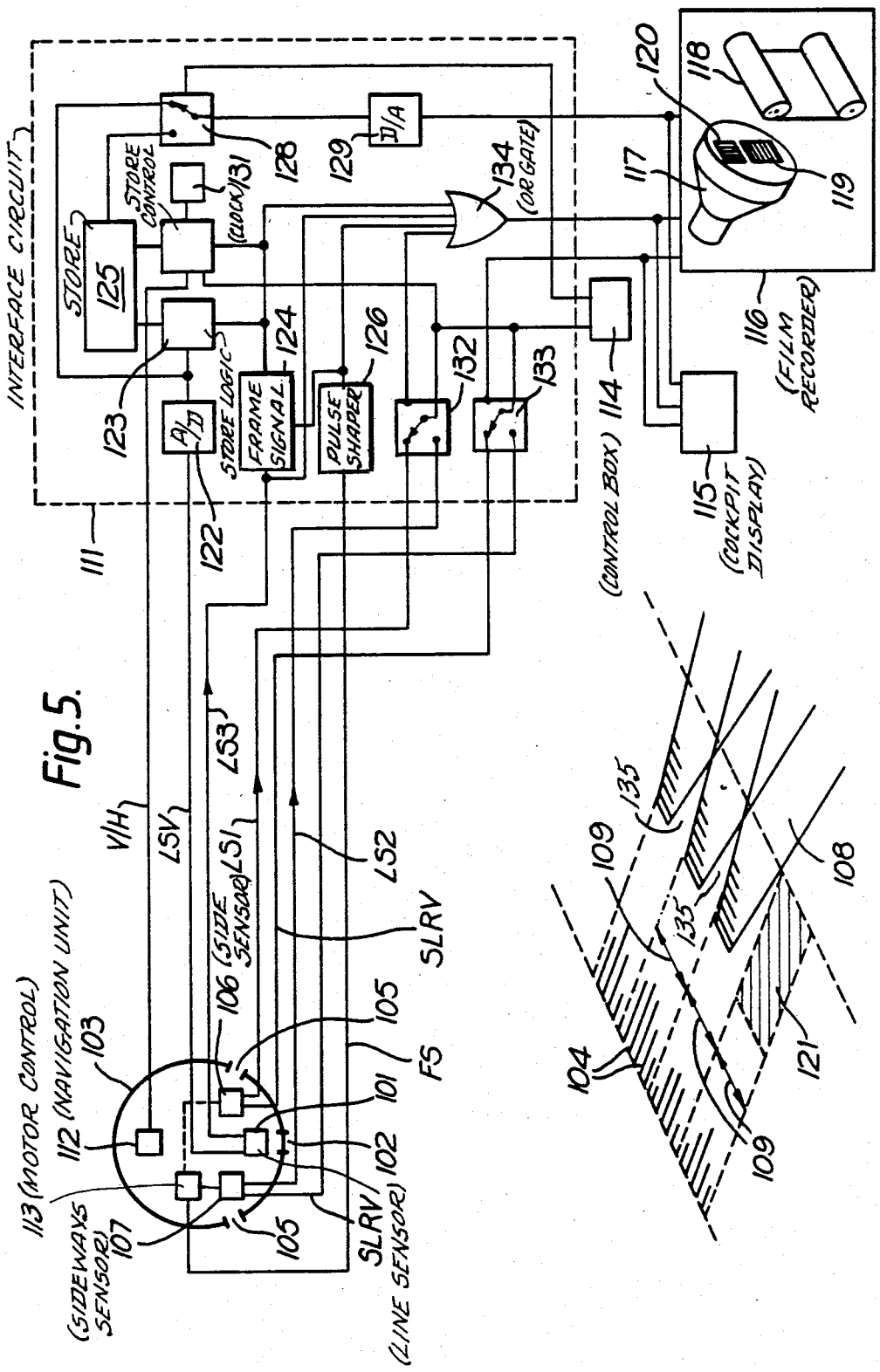

GROUND RECONNAISSANCE

This invention relates to reconnaissance systems for airborne or similar vehicles.

It is known for an aircraft to carry equipment which scans the scene beneath the craft along lines transverse to its direction of movement to produce an infra-red or thermal picture of the scene. An example of such equipment is disclosed in U.S. Pat. No. 1,270,651 but a problem with it is that, towards the extremities of the scan lines, i.e. as the sensor looks towards the right or left-hand side of the craft as opposed to directly downwards, the distance to the ground and hence the area looked at are larger. Thus the area scanned by the equipment is shaped like a bow tie. The problem resides not so much in this particular shape but in the fact that, if the width of the scan lines is set to give complete coverage of the area directly or nearly directly beneath the craft, they inevitably overlap at positions further to the right or left of the craft and a single target may appear in several of them. An improvement can be effected by "bow tie correction" means such as that proposed in U.S. Pat. No. 1,375,158 but such proposals are impracticable when a very wide field of view is required.

According to one aspect of the invention there is provided a method of observing an area of the ground from an airborne craft or spacecraft in which part of the area is scanned along lines extending in one direction by a first scanning means and another part of the area is scanned along lines extending in a different direction by a second scanning means.

According to a second aspect of the invention there is provided reconnaissance equipment in or for use in an airborne craft or a spacecraft, comprising first scanning means operable for scanning a part of an area on the ground along lines extending in one direction and second scanning means operable for scanning another part of said area along lines extending in another direction.

Figure 2:
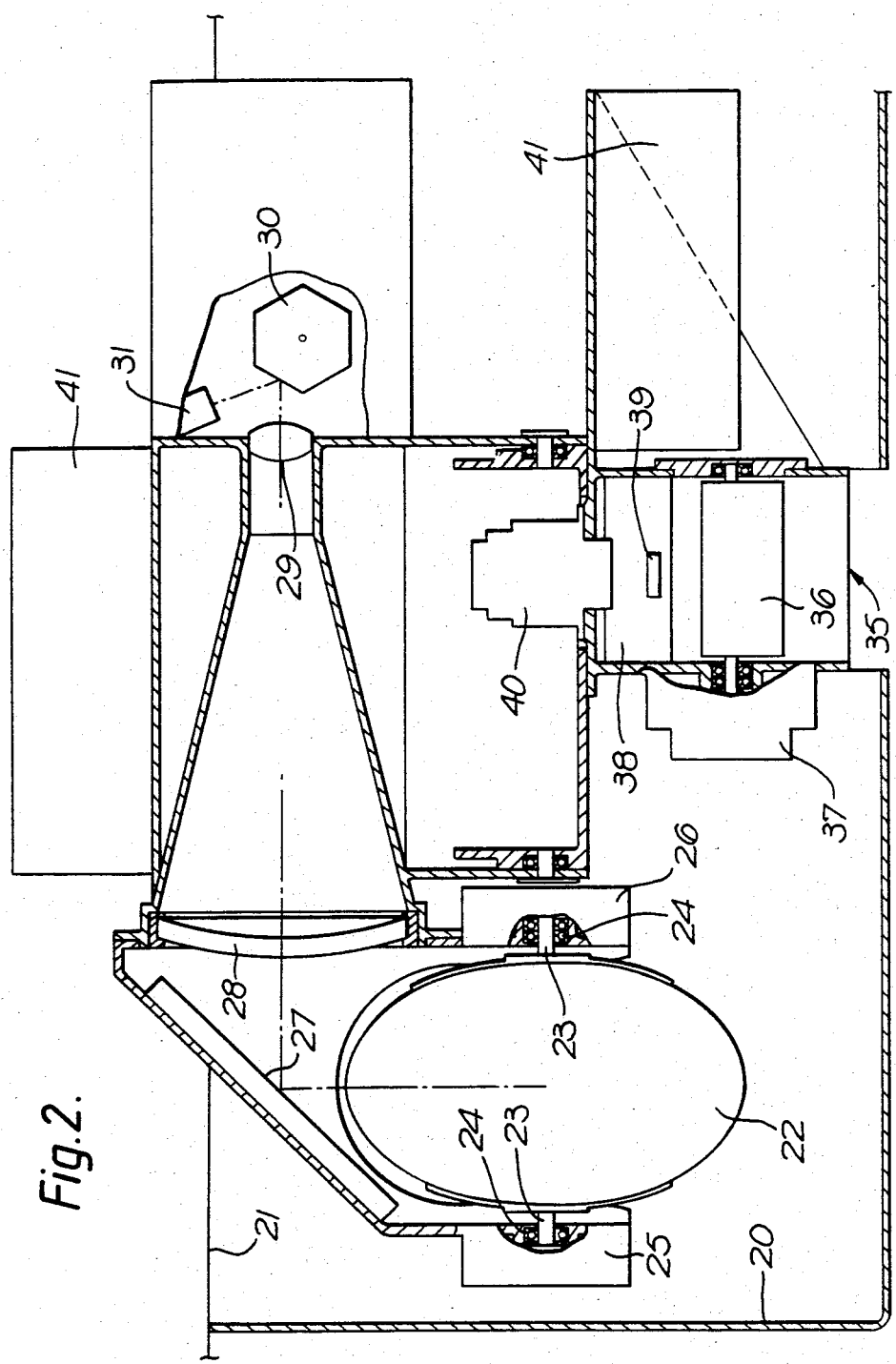
Figure 3:
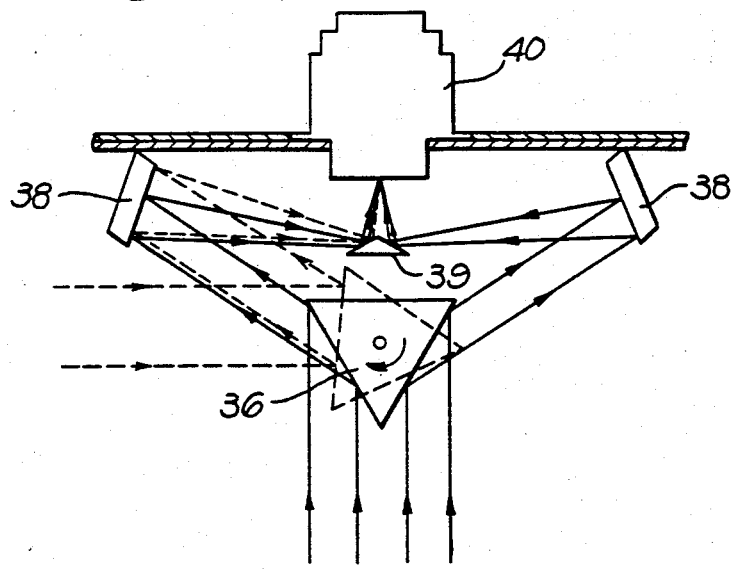
Figure 4:
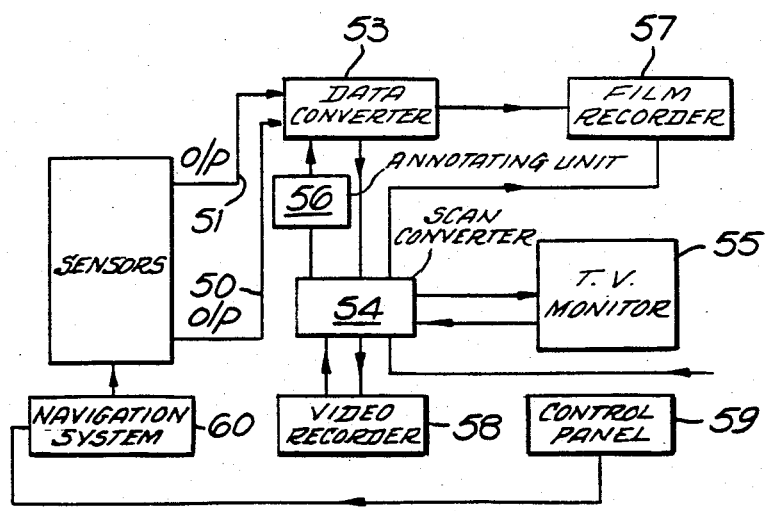

For a better understanding of the invention and to show how it may be carried into effect, reference will now be made, by way of example, to the accompanying drawings, in which:

FIG. 1 is a diagram illustrating the way in which an embodiment of reconnaissance equipment according to the invention scans the area beneath an aircraft, FIG. 2 is a partly sectioned elevation of the reconnaissance equipment, FIG. 3 is a diagrammatic view of part of a linescan sensor used in the FIG. 2 equipment, FIG. 4 is a block diagram of the equipment and its signal processing and recording apparatus, and FIG. 5 is a partly diagrammatic and simplified view of another embodiment of reconnaissance equipment.

The reconnaissance equipment shown in FIG. 2 comprises two infra-red sensors arranged to cover different areas beneath the aircraft as shown in FIG. 1. One sensor, termed the linescan sensor operates in the same way as the sensor proposed in U.S. Pat. No. 1,270,651 except that its coverage is restricted to the area 1 in FIG. 1 which extends between points to respective sides of the aircraft, from which imaginary lines 3 and 4 up to the aircraft include an angle of 150°. Within this area the aforementioned bow-tie effect is reduced so the linescan sensor is not provided with any bow-tie correcting apparatus although it could be if desired. The other sensor, termed the sideways-looking sensor, scans the area 5 extending from one limit of the area covered by the linescan sensor up to whatever distance is desired. For example, it is preferred that the sideways-looking sensor should be capable of looking directly sideways—this would normally mean that the coverage would extend to above the horizon but would nevertheless be useful when the aircraft is passing at low level close to a range of hills or mountains. Within the area 5, the scan lines 6 are parallel to the direction of movement of the aircraft, i.e. perpendicular to the scan lines 7 along which the area 1 is covered. Further, the sideways-looking sensor is constructed so as to scan a swathe of eight lines at a time although this is not essential.

Referring now to FIG. 2, the reconnaissance equipment is mainly contained within a housing 20 slung beneath an aircraft fuselage of which part of the lower skin 21 only is shown. The sideways looking sensor comprises an oval mirror 22 having stub shafts 23 extending from each side of the mirror along its minor axis. The stub-shafts are mounted in bearings 24 and coupled to respective electric motors 25 and 26. One of the motors is driven so as to oscillate the mirror 22 about its minor axis between positions in which it is looking at the inner and outer extremities of the area 5 in FIG. 1. Meanwhile the other motor is controlled so as to bias the average position of the mirror in a way which maintains the area covered constant in the face of any gradual rolling movements of the aircraft. A fixed mirror 27 is mounted above the mirror 22 so as to direct the radiation therefrom to a germanium objective lens 28 from which the radiation passes via a further lens 29 to a rotating octagonal mirror 30 driven by a motor (not shown). From the mirror 30, the radiation is foccussed onto an infra-red detector 31 which comprises a linear array of eight photo-sensitive areas.

The positions of these photo-sensitive areas are such that, at one point in time, the mirror 22 will be receiving radiation from the area covered by the outermost eight scan lines 6a in FIG. 1. Meanwhile, that face of mirror 30 which is reflecting the radiation onto the detector 31 will be moving so as to cause focussed images of the ground areas corresponding to these lines 6a to move across the respective photo-sensitive areas. Then as the mirror 22 moves towards its position in which it receives radiation from the area covered by the innermost eight scan lines 6b in FIG. 1, the mirror 30 moves so that its successive faces produce successions of eight scan lines. The relative speeds of movement of the mirrors 22 and 30 can be made such as to give whatever scanning pattern is desired, i.e. so that the swathes of scan lines overlaps to a greater or lesser extent or not at all.

Referring also to the diagrammatic view of FIG. 3, the linescan sensor is mounted within the housing 20 beneath the sideways-looking sensor so as to view the ground via an aperture 35 in the bottom wall of the housing. It comprises a rotatable mirror faced body 36 in the shape of a triangular prism which is driven to rotate by an electric motor 37. Above and to each side of mirror 36 are two fixed paraboloid mirror strips 38 which direct radiation from the mirror 36 onto a further prism-shaped mirror 39. The mirror 39 which is fixed directs the radiation into an IR detector 40 of which the construction is not shown in detail but which may be of conventional design and include a suitable focussing lens system to focus the radiation onto any suitable photo-sensor. As the mirror 36 rotates an image of the area covered by a transverse line beneath the aircraft is focussed onto the photo-sensor via the mirrors 38 and 39 and moves across the photo-sensor so that, in effect, the line is scanned. The detector 40 could comprise an array of several photo-sensitive areas so that, like the sideways-looking sensor, it scans a swathe of several scan lines at a time but again it need not be like this and is in fact assumed not to be in the particular embodiment being described.

Infra-red detectors generally have to be operated at very low temperatures and so the equipment incorporates two cooling engines 41 one for each detector. Alternative cooling means could be used, for example means for supplying compressed gas which is allowed to expand in the region of the detectors.

The housing 20 has an aperture (not shown) through which the mirror 22 receives radiation and this aperture is preferably covered by a transparent window (not shown). In order that an area corresponding to the area 5 but at the other side of the aircraft might be covered, the equipment could include two sideways-looking sensors or the mirror 22 could be arranged so that it can be reversed to look at the area to whichever side of the aircraft is desired. If the mirror is double-sided, its average position could simply be rotated through a relatively short angle to look to one side or the other of the aircraft. As shown, the lens system of the sideways looking sensor is fixed but it could be made adjustable by providing a suitable servo-mechanism coupled to one or the other lens. Automatic focus adjustment to compensate for various thermal effects can then be provided.

Referring now to FIG. 4, the signals 50 and 51 from the sideways-looking sensor and the linescan sensor are fed to a data converter 53 where they are amplified and shaped and fed out to a scan converter 54.

It is assumed that the detector in the sideways-looking sensor is of the kind which is able to output the signals from its eight photo-sensitive areas in series but, if it is not like this, then there would of course be eight output lines from the sideways-looking sensor instead of one as shown and means would be provided, withing the data converter 53 for example, to serialise them. The scan converter, a computer in fact, is programmed to perform several functions including the reconstruction of the sensor signals to produce whatever form of picture signal is required. For example, it can store a matrix of the signals from the sideways looking sensor and then output them in columns instead of rows as they appear so that, in effect, the scanning direction of the area 5 in FIG. 1 is turned round and made parallel to the scanning direction of the linescan sensor.

The number of scan lines performed to cover the area 5 in FIG. 1 will generally be much greater than that making up one frame of a t.v. picture and so, where the whole or a large part of this area is to be displayed, the scan converter can be made to integrate each group of several successive lines and hence reduce the total number. Alternatively, it can present a magnified display of only part of the total field of view made up of the appropriate number of single lines. In addition, the line scan sensor identifies each line position and uses the identification to accurately register the pictures seen by the two sensors. The scan converter also mixes line and frame synch. signals into the video signal and provides a combined signal for display by an on-board t.v. monitor 55. It receives from the main aircraft computer (not shown) information regarding the height and velocity of the aircraft and modifies and identifies the video signal appropriately, controls the linescan sensor picture to compensate for aircraft roll and it also initiates the production by an annotating unit 56 of signals which are mixed into the video signal by the data converter so that there appears on a photographic record made by a film recorder unit 57 suitable identification annotations. The scan converter is also operable to output signals to, or to receive them from, a video recorder 58. A control panel 59 in the aircraft cockpit is provided to control the operation of the sensors and the sideways looking sensor also receives signals from the navigation system 60 of the aircraft to control the operation of the roll compensating motor.

The scan converter may be operable for recognising and detecting particular predetermined signal patterns indicative of a target for example and for appropriately marking these on the recorded or displayed t.v. picture and/or on the film record.

It will be realised that, during each scan, the sideways looking sensor may see a good deal of the area seen during at least one previous scan but from a position advanced along its direction of travel. The scan converter can be programmed to use the repeat signals to enhance the displayed picture or even to provide a stereoscopic picture if suitably adapted recording and monitoring units are provided.

It will be appreciated that the sensors need not be contained in a housing or pod extending from beneath the aircraft but could for example be housed entirely within its fuselage in which case suitable windows are provided therein. Nor need the linescan sensor and the sideways-looking sensor(s) be in the same housing or near each other in the aircraft fuselage although this is preferred.

The infra-red detectors used are preferably of the kind known in the art as "TED" type detectors, i.e. of the kind to which U.S. Pat. Nos. 1,488,258 and 2,007,909 relate.

The system shown may be operable only in a selective mode whereby only the area 5 or the area 7 may be displayed at a time (although the signals from both areas and the area corresponding to area 5 but on the other side of the aircraft may be recorded provided the scan converter and recorders have sufficient capacity) or, since the scan converter may be made operable to knit together the sensor signals as described earlier, the system can be constructed to provide a panoramic view when desired of the whole area extending from horizon to horizon on the two sides of the aircraft.

The proportions of the overall scanning area covered by the linescan and sideways looking sensors may be modified as desired—for example it might be preferred to have the linescan sensor covering an area which makes an included angle of 200° at the aircraft—the linescan sensor will then cover all the area normally required to be observed and the sideways looking sensor need only be used when it is required to observe a larger than usual area.

In a further embodiment of the invention, shown diagrammatically in FIG. 5, a linescan sensor 101 similar to the linescan sensor described with reference to FIGS. 1 to 3 is mounted over a window 102 in the fuselage 103 of an aircraft so as to scan the area beneath the aircraft along lines 104 transverse to the direction of movement of the aircraft. Also within the aircraft fuselage, adjacent respective windows 105, are two sideways-looking sensors 106 and 107 each similar to the sideways-looking sensor of FIGS. 1 to 3 and operable for scanning along swathes of lines parallel to the direction of movement of the aircraft, the look-directions of the two sensors being to the port and starboard sides of the aircraft respectively. The sensor 106 thus scans a series of areas 108 to the port side of the craft while the sensor 107 sees a similar series of areas (not shown) to the starboard side. The video signals SLRV from the photosensitive areas of the infra-red detectors of the two sideways-looking sensors 106 and 107 are fed in series to an interface circuit 111 within the aircraft. Also fed to this circuit are respective line synchronisation signals LS1, LS2 and LS3 associated respectively with the two sideways-looking sensors 106 and 107 and the linescan sensor 101 and formed, for example, by suitable transducers (not shown) which sense the positions of the respective rotating polygonal mirrors of the sensors, the video signal LSV from the linescan sensor, a signal V/H indicative of the ratio between velocity and altitude of the aircraft and obtained, for example, from navigation apparatus 112 within the craft, and a frame synchronisation signal FS associated with the sideways-looking scanners. The signal FS is derived from the flyback portion of signals supplied by a motor control signal generating circuit 113 which controls, in common, the oscillating movements of the framing mirrors (not shown in FIG. 5) of the two sideways-looking sensors.

The interface circuit 111 also receives two control signals from a cockpit mounted control box 114 and outputs video and synchronisation signals to a cockpit-mounted display unit 115 and a film recorder 116. The film recorder 116 comprises a "flying spot" display unit 117 for example a cathode-ray tube as shown but perhaps alternatively a laser-type display unit (not shown), a film transport mechanism 118 for transporting a film past the screen of the display unit and means (not shown) for ensuring proper focussing of the displayed picture on the film, for example a lens system or an optic-fibre faceplate on display unit 117. The film recorder may be a commercially available item, for example the recorder supplied by the Honeywell Company. By means of the control box 114, any one of three pictures modes may be recorded. The first of these is formed from the flying spot of the display unit 117 simply scanning back and forth in synchronism with the scanning operation of the linescan sensor and being modulated with the video signal from that sensor while the film is moved continuously past the display unit screen. Thus, there is obtained a continuous recording of the area passed over by the aircraft. In respective ones of the other two modes, one of the sideways-looking sensors is chosen and successive pictures are displayed of the areas, such as 108, scanned by the chosen sensor. In addition, however, since as can be seen from FIG. 5 the scan pattern of the chosen sensor may miss some ground area portions, such as the portions 135, the size of these missed portions depending on the speed and height of the aircraft, a part of the view seen by the linescan sensor may also be recorded. The area scanned by the linescan sensor 101 extends outwards to overlap the innermost parts of the successive areas 108 scanned by the sideways-looking sensors as shown. Thus, where the aircraft is at a speed and height such that ground area portions such as 118 are missed, along with each area 108 pictured at 119 on the screen of display unit 117, there is displayed a small picture 120 comprising an appropriate part of the view seen by the linescan sensor, e.g. one of the pictures 120 will be of say the cross-hatched area 121 shown in the figure.

To provide the pictures 120, portions of the video signal LSV from the linescan sensor are stored and so, to facilitate this, the signal is sampled and converted to a series of digital sample values by an analog to digital converter 122 in the interface circuit 111. The series of digital values from the converter 122 is made available to a memory input logic circuit 123 from whence, under the control of a linescan sensor frame signal generator 124, the values are read into a digital signal store 125. The frame signal generator provides a series of pulses each representing the conjunction of a frame synchronisation signal FS, received via a pulse shaping circuit 126, associated with the sideways-looking sensors 106 and 107 and a line synchronisation signal LS3 received from the linescan sensor 101. Thus, although in fact the linescan sensor simply carries on scanning lines one after another beneath the aircraft, the scanned area is notionally divided into parts 109 as shown by the dashed lines in the figure, the stored values corresponding to respective groups each of an integral number of lines scanned during about the time taken for the sideways-looking sensors to scan one of the areas 108.

An output from the store 125 leads to a selector switch 128 which also has an input direct from the analog-to-digital converter 122, and a control input from the control 114. Dependent on selection made via the control box 114, switch 128 can pass the signals from the converter 122 on via a digital-to-analog converter 129 to the display unit 115 and recorder 116 to give the first picture mode, i.e. in which a continuous recording of the linescan sensor signal only is made, or can pass to converter 129 signals read-out from store 125. Read-out from store 125 is controlled by a memory control unit 130 which, in dependence upon information from control box 114 regarding which of the second two display modes has been selected, i.e. which of the two sideways-looking sensors has been selected, and in dependence upon the V/H signal, the linescan sensor frame synchronisation signal from generator 124, and clock signals from a clock generator 131, reads out of store 125 the values associated with the desired size and position of the portion of each part 109 which is to be displayed as picture 120. Meanwhile, dependent upon the selection at control box 114, the selector switches 132 and 133 select the desired port or starboard line sync. and video signals for passing on via or-gate 134, along with the linescan sensor line and frame sync. signals, to recorder 116 and display unit 115.

In FIG. 2, that one of the motors 25 and 26 which is used to compensate for aircraft roll may be replaced by transducing means wired into an electronic feedback circuit which influences the retained motor so as to compensate for such roll. For example, the feedback circuit may be a position and velocity feedback circuit and then the transducing means can comprise a synchrogenerator for mirror position encoding and a tachogenerator for velocity encoding. Aircraft roll can be sensed by a rate gyro system, either one already existing within the aircraft navigation equipment or one provided specifically for control of the linescan equipment.

We claim:

1. Reconnaissance equipment in or for use in an airborne craft or a spacecraft for scanning an area on the ground, and comprising first scanning means which is operable for scanning a part of said area lying beneath and to each side of the craft along lines transverse to the direction of movement of the craft, and second scanning means which is operable for scanning a part of said lying to one side of the craft along lines parallel to said direction of movement.

2. Equipment according to claim 1, wherein the scanning means are connected via control apparatus to picture recording and display means, the control apparatus being operable for causing recording and display of the view seen by a selected one of the scanning means.

3. Equipment according to claim 1, wherein the scanning means are connected via control apparatus to picture recording and display means, the control apparatus being operable for combining signals from the two scanning means for causing recording and display of a combination of the views seen by the two scanning means.

4. Equipment according to claim 1, wherein each scanning means comprises an infra-red radiation line scanner.

5. Equipment according to claim 1, wherein the ground parts scanned by the two scanners overlap and the scanners are connected to a recorder via an interface unit operable for causing recording of pictures each of a view seen by one of the scanning means and a part of a view seen by the other scanning means.

6. In an aircraft, reconnaissance equipment including in combination, a first infra-red line scanner for scanning the ground along lines transverse to the direction of movement of the aircraft and extending beneath and to at least one side of the aircraft, a second infra-red line scanner positioned for looking to said one side of the aircraft and operable for scanning along lines parallel to the direction of movement of the aircraft with a framing scan movement perpendicular to these lines, a picture recorder and electronic means connected between the recorder and the first and second line scanners and operable for causing recording of the view seen by a selected one of the scanners.

7. Reconnaissance equipment according to claim 6, wherein the first scanner is operable to scan over an area which overlaps the inner ends of the respective areas scanned by the second scanner during the successive frame scans thereof, and the electronic means is operable for causing recording of pictures of said respective areas scanned by the second scanner along with respective pictures of portions of the area scanned by the first scanner.

* * * * *

UNITED STATES PATENT AND TRADEMARK OFFICE
CERTIFICATE OF CORRECTION

PATENT NO.   : 4,516,158
DATED        : May 7, 1985
INVENTOR(S)  : GRAINGE et al

It is certified that error appears in the above-identified patent and that said Letters Patent is hereby corrected as shown below:

In the heading add:

--[63]   Continuation-in-part of Serial No. 289,735, filed Aug. 3, 1981-- and under [30] Foreign Application Priority Data add:

--Aug. 2, 1980    [GB]   United Kingdom    8025314--

Column 1, before line 4, add:

--This application is a continuation-in-part of our application Serial No. 289,735, filed August 3, 1981, now abandoned.--

Signed and Sealed this

Twenty-first Day of October, 1986

[SEAL]

Attest:

DONALD J. QUIGG

Attesting Officer    Commissioner of Patents and Trademarks